United States Patent [19]

McCracken et al.

[11] Patent Number: 5,315,199
[45] Date of Patent: May 24, 1994

[54] BIDIRECTIONAL BRUSH HOLDER ASSEMBLY

[75] Inventors: Robert McCracken, Easley; Ronald C. McCurry, West Union, both of S.C.

[73] Assignee: Ryobi Motor Products Corp., Easley, S.C.

[21] Appl. No.: 55,738

[22] Filed: Apr. 30, 1993

[51] Int. Cl.⁵ .......................................... H02K 13/00
[52] U.S. Cl. ...................................... 310/239; 310/242
[58] Field of Search ............... 310/239, 240, 241, 242, 310/245, 247, 248, 249

[56] References Cited

U.S. PATENT DOCUMENTS

| | | | |
|---|---|---|---|
| 3,553,504 | 1/1971 | Balcke et al. | 310/68 |
| 3,898,493 | 8/1975 | Schaffer | 310/247 |
| 4,254,353 | 3/1981 | Matsuda | 310/239 |
| 4,347,455 | 8/1982 | Major et al. | 310/239 |
| 4,926,075 | 5/1990 | Fushiya et al. | 310/239 |
| 4,990,811 | 2/1991 | Nakata et al. | 310/242 |
| 5,113,106 | 5/1992 | Schmid | 310/239 |
| 5,184,041 | 2/1993 | Baer et al. | 310/239 |
| 5,198,712 | 3/1993 | Bolzan et al. | 310/247 |

FOREIGN PATENT DOCUMENTS 61-180549  8/1986  Japan ..................... 310/239

Primary Examiner—Steven L. Stephan
Assistant Examiner—Matthew Nguyen
Attorney, Agent, or Firm—Brooks & Kushman

[57] ABSTRACT

A brush holder assembly (10) adapted for selective cooperation with a plurality of motor housings (12,14) and for holding a brush (90) in contact with a rotatable commutator (42) is disclosed. The brush holder assembly (10) comprises an elongated brush (90), an elongated body (50) and an elongated insert (52). The brush (90) has a generally non-circular cross-section and a semi-cylindrical free end (93) shaped to complementarily engage the commutator (42). The elongated body (50) has a non-circular inner bore (60) and a mounting arm (66) for selectively mounting the body (50) to a plurality of motor housings (12,14) in at least two different angular orientations relative to the axis of the bore (60). The elongated insert (52) is adapted to be selectively received and held within the bore (60) of the body (50) in a plurality of different angular orientations relative to the axis of the bore (50). The insert (52) defines a non-circular cavity for receiving the brush (90) in a predetermined angular orientation with respect to the cavity. When the body (50) is mounted to the motor housing (12,14), the insert (52) may be angularly aligned within the bore (60) of the body (50) such that the brush (90) can only be placed within the insert (52) with the semi-cylindrical free end (93) of the brush (90) in coaxial alignment with the commutator (42).

8 Claims, 2 Drawing Sheets

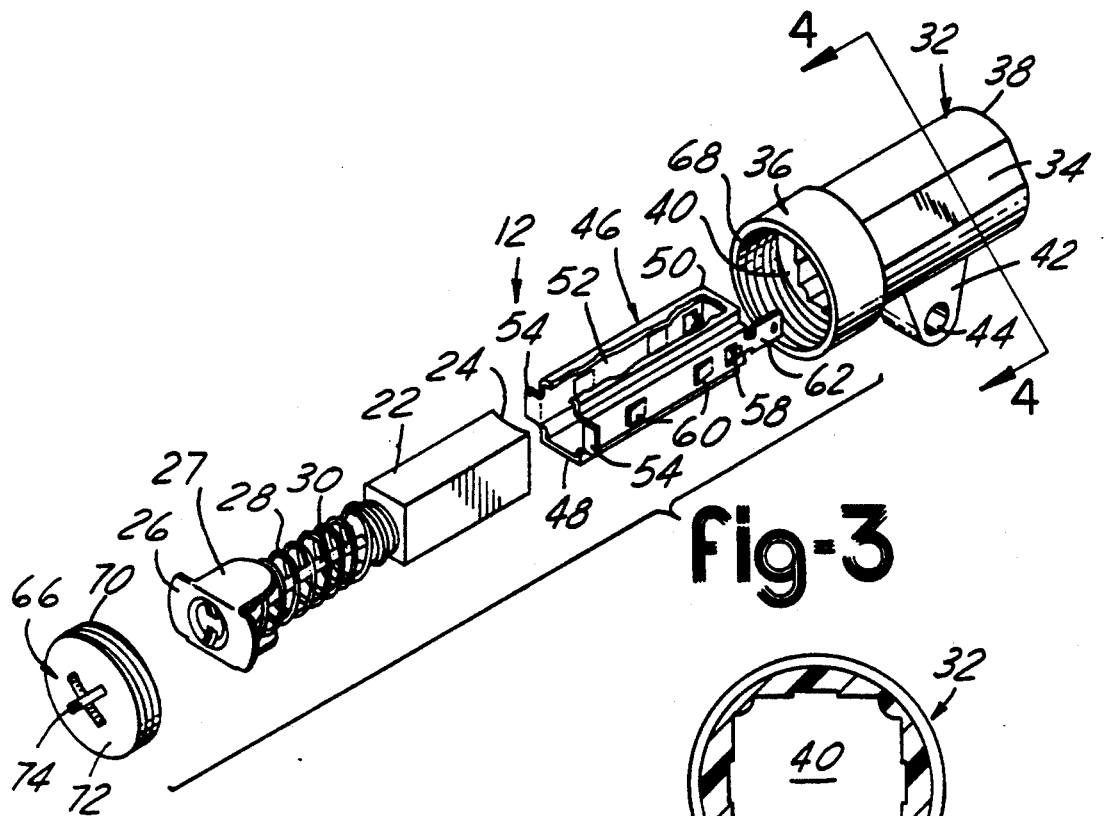
fig-3
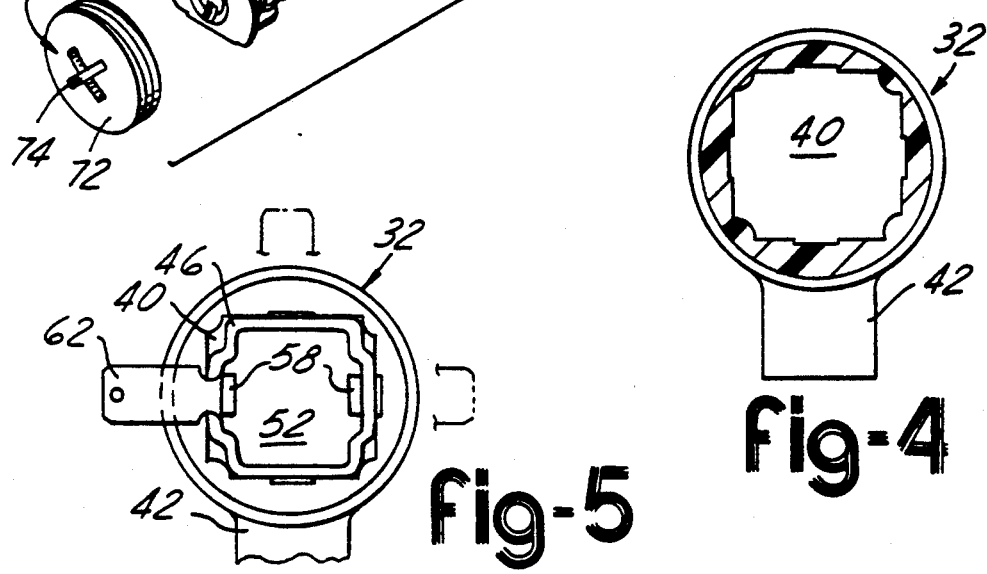
fig-4
fig-5
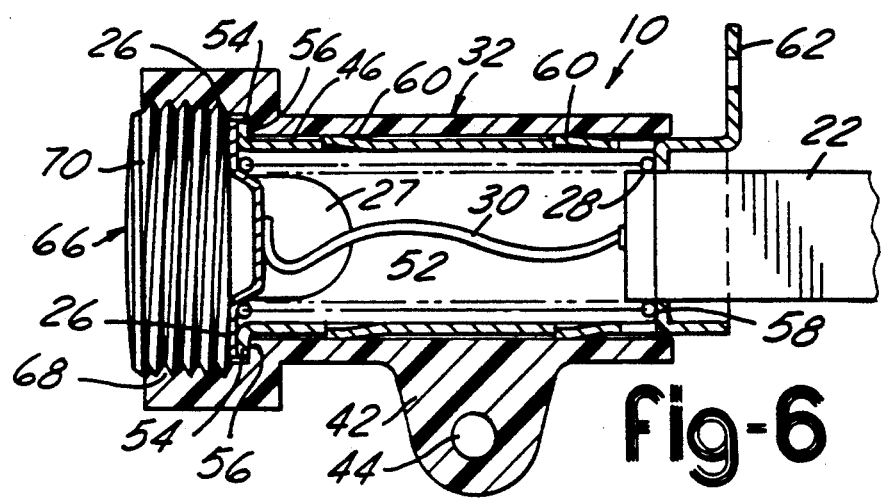
fig-6

5,315,199

BIDIRECTIONAL BRUSH HOLDER ASSEMBLY

TECHNICAL FIELD

This invention relates to brush holder assemblies for holding brushes which engage commutators of electric motors.

BACKGROUND ART

Traditionally, clam-shell and stack-up cylindrical motor housings have been used to enclose electric motors for power tools. Clam-shell motor housings include two semi-cylindrical halves which are joined together along planes which are colinear with the longitudinal axes of the cylindrical housings. In contrast, the stack-up motor housings split apart along planes perpendicular to the longitudinal axes of the cylindrical housings and use cylinders with end caps to enclose the motors.

Each of these types of housing generally have threaded mounting apertures for receiving fasteners which attach brush holder assemblies to the housings. Due to their particular geometric configuration and method of manufacture, the mounting apertures in the clam-shell motor housings typically have axes which extend perpendicular to the longitudinal axes of their cylindrical housings. The axes of mounting apertures in stack-up motor housings generally extend parallel to the longitudinal axis of the housings. Accordingly, different configurations of brush holder assemblies are needed to mount to the mounting apertures in these different types of motor housings while still properly positioning brushes secured in the holder assemblies in proper alignment with a commutator of a motor.

The present invention is intended to overcome the problem of having to manufacture separate brush holder assemblies for use with each type of clam-shell or stack-up motor housing.

SUMMARY OF THE INVENTION

A brush holder assembly adapted for selective cooperation with a plurality of motor housings and for holding a brush in contact with a rotatable commutator is disclosed. The brush holder assembly comprises an elongated brush, an elongated body and an elongated insert. The brush has a generally non-circular cross-section and a semi-cylindrical free end shaped to complementarily engage the commutator. The elongated body has a non-circular inner bore and a mounting arm for selectively mounting the body to a plurality of motor housings in at least two different angular orientations relative to the axis of the inner bore. The elongated insert is adapted to be selectively received and held within the inner bore of the body in a plurality of different angular orientations relative to the axis of the bore. The insert defines a non-circular cavity for receiving the brush in a predetermined angular orientation relative to the cavity. When the body is mounted to the motor housing, the insert may be angularly aligned within the bore of the body such that the brush can only be placed within the insert with the semi-cylindrical free end of the brush in coaxial alignment with the commutator.

It is an object of the present invention to provide a bi-direction brush holder assembly which can hold a brush therein in two orthogonal angular orientations relative to a mounting arm on the brush holder assembly.

An advantage of the present invention is that one brush holder assembly may be utilized to properly align a brush with a commutator in different types of motor housings.

The above objects are readily apparent from the following detailed description of the best mode for carrying out the invention when taken in connection with the accompanying drawings.

BRIEF DESCRIPTION OF THE DRAWINGS

FIG. 3 is an exploded view, partially broken away, of components comprising a brush holder assembly made in accordance with the present invention;

FIG. 4 is a front end view of a body of the brush holder;

FIG. 5 is a rear end view of an insert and brush received within the body; and

FIG. 6 is a cross-sectional view taken along line 6—6 of FIG. 2.

BEST MODE FOR CARRYING OUT THE INVENTION

The preferred embodiment of a bidirectional brush holder assembly 10, made in accordance with the present invention, is shown in FIGS. 3-6. Brush holder assembly 10 may be utilized with either a clam-shell motor housing, generally indicated at 12, or a stack-up motor housing, generally indicated at 14, which are shown in respective FIGS. 1 and 2.

Figure 2:
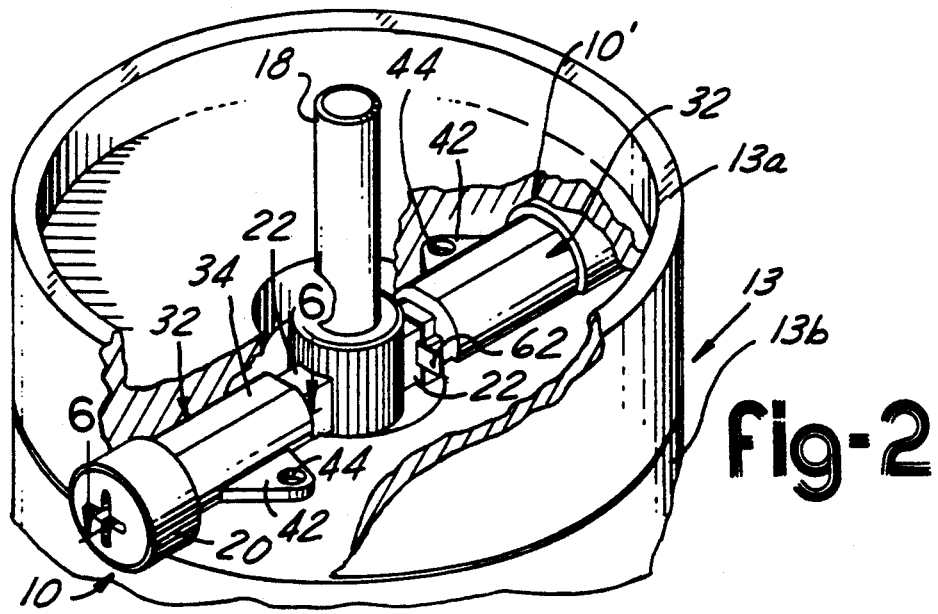
FIG. 2 is a perspective view, partially broken away, of a pair of brush holder assemblies which mount to a stack-up motor housing.

Clam-shell motor housing 12 is formed from two complementary halves 12a and 12b which mate along a vertical plane which passes along longitudinal axis 13 of housing 12. Stack-up motor housing 14, shown in FIG. 2, is comprised of two halves 14a and 14b which join along a horizontal plane which is perpendicular to longitudinal axis 15 of housing 14.

Each of halves 12a, 12b and 14a, 14b have respective recesses 16a, 16b and 18a and 18b which complementarily receive a pair of brush holder assemblies 10 therein when housings 12 and 14 are assembled. Openings 20 and 22 are formed on the outer radial surfaces of housings 12 and 14 by recesses 16a, 16b and 18a, 18b. Portions of brush holder assemblies 10, which will be later described, may be replaced through openings 20 and 22 without having to separate halves 12a, 12b, or 14a, 14b.

Housing half 12a has downwardly extending flanges 24 in which portions of recesses 16a are located. Threaded mounting apertures 26, which have longitudinal axes 28 extending perpendicular to longitudinal axis 13 of housing 12, are formed in recesses 16a of housing half 12a. Screws 30 may be used to secure brush holder assemblies 10 to housing half 12a.

Similarly, stack-up motor housing 14 has a top wall 32 in which recess 18a is formed. Top wall 32 has threaded mounting apertures 34 for receiving screws 30 (not shown) to affix brush holder assemblies 10 to housing 14. However, in this case, longitudinal axes 36 of apertures 30 extend vertically and parallel to longitudinal axis 15 of housing 14.

Housings 12 and 14 each contain a rotor assembly 40 having a commutator 42 located in longitudinal alignment about a motor shaft 44. Brush holder assemblies 10 are located such that they are in contact with commutators 42. This relationship will be more fully described below.

A brush holder assembly 10 is shown in an exploded view in FIG. 3. Components of brush holder 10 include a cylindrical body 50, an insert 52, a brush assembly 54 and a plug 56.

Body 50 is formed from a plastic and is best seen in FIGS. 3 through 6. Body 50 has inner bore 60 which sized to receive insert 52. Inner bore 60 is generally square with four longitudinally extending grooves 62 extending along the mid-length of its sides and four longitudinally extending arcuate ridges 64 located in its corners. The outer surface of body 50 is generally cylindrical and smooth.

A mounting arm 66 is integrally formed with the outer cylindrical surface of body 50. An aperture 68 extends through arm 66 perpendicular to the axis of inner bore 60. Aperture 68 has two counterbores 70 and a reduced diameter portion 72 connecting therebetween. When a screw 30 is inserted into aperture 68, the head of screw 30 is retained in one of the counterbores 72 with the threaded shank of a screw 30 extending through reduced diameter portion 72 to be threadedly received within either of threaded mounting apertures 26 or 34 of housings 12 or 14.

Inner bore 60 also has an enlarged diameter plug receiving portion 74 which is threaded to retain plug 56. An inner stepped surface 75, as seen in FIG. 4, is formed where portion 74 meets with the rectangular-shaped portion of inner bore 60.

Insert 52 is elongate and is generally cross-shaped in cross-section having two smooth opposed walls 76 and adjacent thereto, two opposed walls 78 having longitudinal spaced ridges 80 on the outer surface thereof. Ridges 80 are received within grooves 62. Located at each of the intersections of walls 76 and 78 are L-shaped corners portions 82. Walls 76 and 78 and corner portions 82 are sized to be received within inner bore 60 and arcuate ridges 64 of body 50. As inner bore 60 is generally square, insert 52 can be received within body 50 with any of walls 76 or 78 being located proximate mounting arm 66. Accordingly, insert 52 may be rotated in 90° rotational increments, relative to the axis of inner bore 60, and still be received within bore 60.

Attached at one end of walls 68 are retaining flanges 84 which seat against stepped surface 75 of body 50 to axially position insert 52 within body 50. At the opposite end of a wall 78 is a terminal 85. FIG. 5 shows terminal 85 in a bent-out configuration ready to mate with a lead located in either housing 12 or 14. FIG. 3 shows terminal 85 in a straight configuration.

Figure 1:
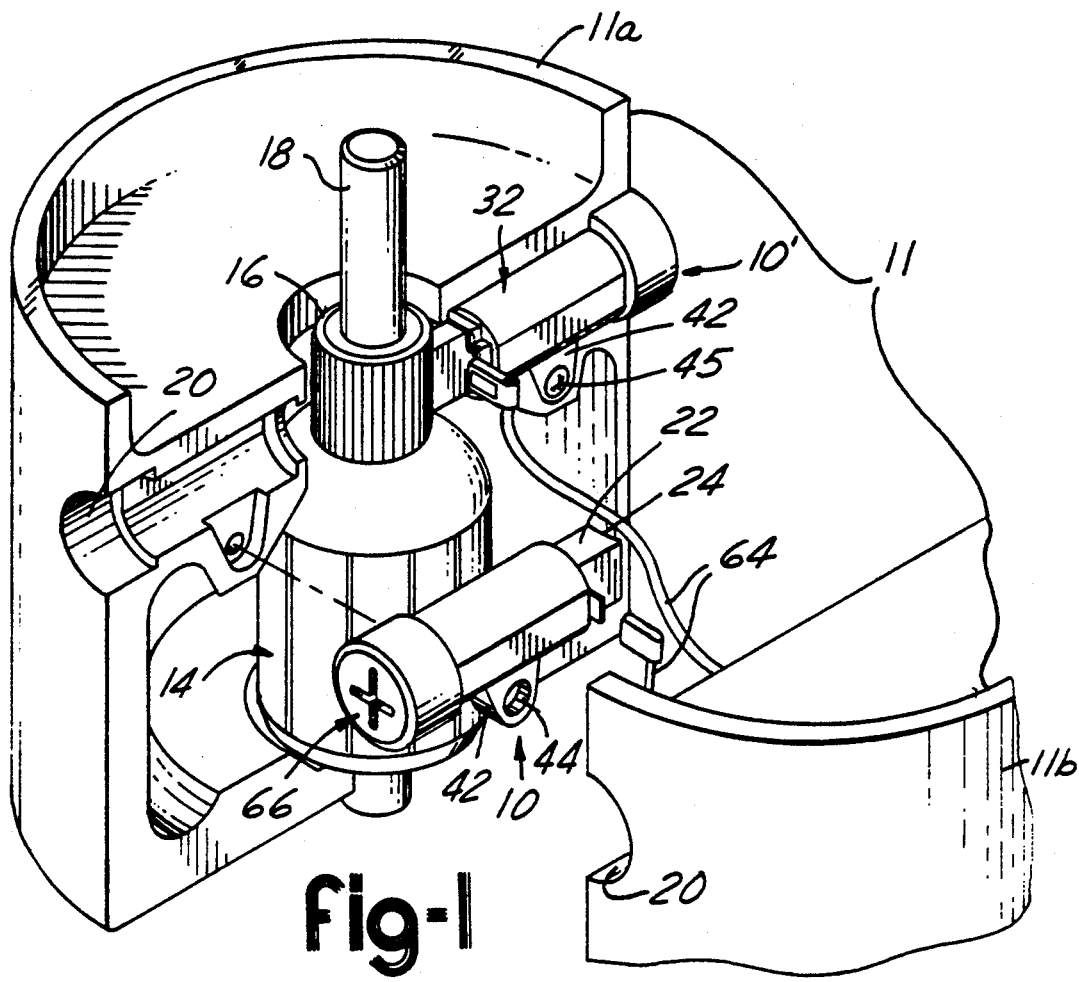
FIG. 1 is a partially exploded perspective view, partially broken away, of a pair of brush holder assemblies which mount to a clam-shell motor housing.

Brush assembly 54 include a carbon brush 90, a spring 92, an end cap 94 and a copper braid 96. Brush 90 is elongate and rectangular in cross-section. The height of brush 90 can be accommodated between walls 76 of insert 52 but not between walls 78. Accordingly, the angular orientation of brush 90 relative to insert 52 is fixed, as shown in FIG. 5. Brush 90 has a semi-cylindrical end surface 93 which is contoured to be coaxially alignable with commutator 42, as illustrated in FIGS. 1 and 2. Curved end surface 93 curves along its width while remaining straight along its height as can be seen on the edges of end surface 93 in FIG. 3.

At the other end of brush 90 is a cylindrical knob 98 about which an end of spring 92 is wrapped. The other end of spring 92 is affixed to end cap 94. Braid 96 is electrically conductive and is secured at one end to knob 98 of brush 90 and at the other to end cap 94. End cap 94 is generally U-shaped having a pair of flanges 100, which overlap the outer diameter of a portion of spring 92, and an oval shaped bight portion 102 which connects flanges 100.

Plug 56 is cylindrical and has threads which are engageable with the threads on body 50. On a back surface of plug 56 are crossed slots 104 which are adapted to receive a tool, such as a screwdriver, so that plug 56 can be threaded into and out of engagement with body 50.

Assembled brush holder assembly 10 is shown in FIG. 6. Plug 56 is threaded into body 50 with spring 92 biasing brush 90 away from plug 56. As seen in FIGS. 1 and 2, semi-cylindrical free ends 93 of brushes 90 are in coaxial alignment and contact with the radial surfaces on commutators 42 in both the clam-shell motor housing 12 and in the stack-up motor housing 14. This is possible because inserts 52 can be inserted into bodies 50 with any of walls 78 or 80 being positioned adjacent mounting arms 66. Accordingly, apertures 68 of mounting arms 66 of bodies 50 can be coaxially aligned with either of mounting apertures 26 or 34 of housings 12 or 14 while free end 93 is coaxially aligned with commutators 42.

When a motor is assembled during manufacture, inserts 52 are appropriately orientated within inner bores 60 of bodies 50 such that free ends 93 of brushes 90 must be in coaxial alignment with commutators 42 when brush assemblies 54 are inserted into insert 52. Brushes 90 eventually are worn down during operation of a motor and must be replaced. To do so, plugs 56 are unscrewed and brush assemblies 54 are removed from within inserts 52 and new brush assemblies 54 inserted. As inserts 52 were properly aligned during initial assemblies of motor housings 12 or 14, the new brushes 90 inserted into inserts 52 must necessarily be coaxially aligned with commutators 42 as well.

By allowing inserts 52 to be alignable within bodies 50 at different angular orientations, only a single configuration of brush holder assemblies 10 need be manufactured for use with both clam-shell motor housing 12 or a stack-up motor housings 14.

While the best mode for carrying out the invention has been described in detail, those familiar with the art to which this invention relates will recognize various alternative designs and embodiments for practicing the invention.

What is claimed is:

1. A brush holder assembly adapted for selective cooperation with a plurality of types of motor housings and for holding a brush in contact with a rotatable commutator, the brush holder assembly comprising:

an elongated brush having a generally non-circular cross-section and a generally semi-cylindrical free end shaped to complementarily engage the commutator;

an elongated body having a non-circular inner bore extending along a longitudinal axis and mounting means for selectively mounting the body to a plurality of types of motor housings in at least two different angular orientations relative to the axis of the bore; and an elongated insert adapted to be selectively received and held within the bore of the body in a plurality of different angular orientations relative to the axis of the bore, the insert defining a non-circular cavity for receiving the brush in a predetermined angular orientation with respect to the cavity;

wherein when the body is mounted to any one of the plurality of types of motor housings, the insert may be angularly aligned within the bore of the body such that the brush can only be placed within the insert with the semi-cylindrical free end of the brush in coaxial alignment with the commutator.

2. The assembly of claim 1 wherein:
the inner bore is square in cross-section.

3. The assembly of claim 1 wherein:
the brush is rectangular in cross-section and the cavity has a complementary oblong inner rectangular periphery receiving the brush therein.

4. A brush holder assembly adapted for selective mounting with a plurality of types of motor housings and for holding a brush in contact with a rotatable commutator, the brush holder assembly comprising:
an elongated brush having a non-circular cross-section and a generally semi-cylindrical free end;
an elongated insert having a non-circular outer surface and an inner periphery which receives the brush in a fixed angular orientation relative to the inner periphery; and
an elongated body which has an inner bore extending along a longitudinal axis which selectively receives the insert therein in a plurality of angular orientations, the body having mounting means for selectively mounting the body to a plurality of types of motor housings in at least two different angular orientations relative to the longitudinal axis of the bore;
wherein when the body is mounted to any one of the plurality of types of motor housings, the insert may be angularly aligned within the bore of the body such when the brush is placed within the insert, the semi-cylindrical free end of the brush is coaxially aligned and in contact with the commutator.

5. The brush holder assembly of claim 1 wherein:
the different angular orientations at which the insert may be received in, and relative to, the bore of the body include first and second predetermined positions spaced 90° apart about the longitudinal axis.

6. The brush holder of claim 4 wherein:
the different angular orientations at which the insert may be received in, and relative to, the bore of the body include first and second predetermined positions spaced 90° apart about the longitudinal axis.

7. The brush holder of claim 1 wherein:
the different angular orientations at which the insert may be received in, and relative to, the bore of the body about the longitudinal axis include angular orientations spaced apart by other than 180° angular differences.

8. The brush holder of claim 4 wherein:
the different angular orientations at which the insert may be received in, and relative to, the bore of the body about the longitudinal axis include angular orientations spaced apart by other than 180° angular differences.

* * * * *